United States Patent
Oishi et al.

(12)

(10) Patent No.: US 6,340,330 B1
(45) Date of Patent: Jan. 22, 2002

(54) GAME MACHINE AND INFORMATION STORAGE MEDIUM

(75) Inventors: Masuya Oishi, Yokohama; Teruaki Konishi; Hiroaki Yotoriyama, both of Kawasaki; Tadashi Iguchi, Yokohama, all of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/077,926

(22) PCT Filed: Oct. 8, 1997

(86) PCT No.: PCT/JP97/03602

§ 371 Date: Sep. 21, 1998

§ 102(e) Date: Sep. 21, 1998

(87) PCT Pub. No.: WO98/15328

PCT Pub. Date: Apr. 16, 1998

(30) Foreign Application Priority Data

Oct. 9, 1996 (JP) .............................................. 8-287534

(51) Int. Cl.⁷ ............................................... A63F 13/00
(52) U.S. Cl. ............................... 463/8; 463/7; 463/43; 463/1
(58) Field of Search ............................ 463/8, 7, 30, 31, 463/32, 36, 37, 43, 44, 47.2, 47.4, 47.5; 434/16, 17, 18, 19, 20–24

(56) References Cited

U.S. PATENT DOCUMENTS

| | | | |
|---|---|---|---|
| 5,261,041 A | | 11/1993 | Susman |
| 5,267,734 A | | 12/1993 | Stamper et al. |
| 5,366,376 A | | 11/1994 | Cooperman et al. |
| 5,390,937 A | * | 2/1995 | Saksguchi et al. .......... 273/434 |
| 5,415,549 A | | 5/1995 | Logg |
| 5,575,717 A | * | 11/1996 | Houriet, Jr. et al. .......... 463/29 |
| 5,649,861 A | * | 7/1997 | Okano et al. ................. 463/30 |

FOREIGN PATENT DOCUMENTS

| | | |
|---|---|---|
| JP | A-2-283390 | 11/1990 |
| JP | A-4-51984 | 2/1992 |
| JP | A-4-213780 | 8/1992 |
| JP | A-4-233674 | 8/1992 |
| JP | A-4-267284 | 9/1992 |
| JP | U-5-74589 | 10/1993 |
| JP | A-6-139368 | 5/1994 |
| JP | A-7-148351 | 6/1995 |
| JP | A-7-155463 | 6/1995 |
| JP | A-7-200165 | 8/1995 |
| JP | A-8-182860 | 7/1996 |
| JP | A-9-155065 | 6/1997 |

OTHER PUBLICATIONS

Brady Games DOOM Brochure pp. 1–4 and 22–57, Feb. 1994.*

* cited by examiner

*Primary Examiner*—Jessica J. Harrison
*Assistant Examiner*—John M Hotaling, II
(74) *Attorney, Agent, or Firm*—Oliff & Berridge, PLC

(57) ABSTRACT

An object of the present invention is to provide a game device which gives variety to a fighting game for leading a player to play the game repeatedly, and to provide an information storage medium usable in the game device. The player can select one of a normal game mode in which a game character controlled by the player fights against an enemy game character and a weapon obtaining mode in which the player's game character can obtain an item (e.g., weapon) to be used. The weapon obtained in the weapon obtaining mode can be used in the normal game mode. Depending on the weapon used by the player's game character, various functions such as the number and type of special techniques, the basic position, a series of actions subsequent to the basic position, a hit area of weapon, offensive power, durability and so on may be changed in the same game character controlled by the player. The weapon obtaining mode may also be used as an operation guidance mode for beginners. In the weapon obtaining mode, a map having a plurality of points set thereon is displayed. The map can display information relating to a weapon obtainable at each of the points on the map.

28 Claims, 16 Drawing Sheets

FIG.2A
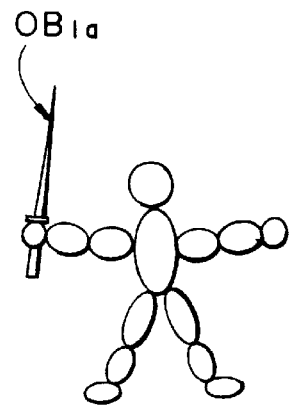
FIG.2B
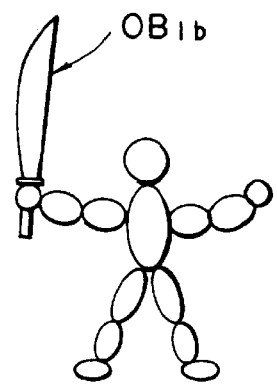
FIG.2C
|  | IDENTIFICATION INFORMATION | POSITIONAL INFORMATION | DIRECTIONAL INFORMATION |
|---|---|---|---|
| WEAPON OBJECT | $OB_{1a} \rightarrow OB_{1b}$ | - - - - | - - - - |
| HEAD OBJECT | $OB_2$ | - - - - | - - - - |
| BODY OBJECT | $OB_3$ | - - - - | - - - - |
|  |  |  |  |

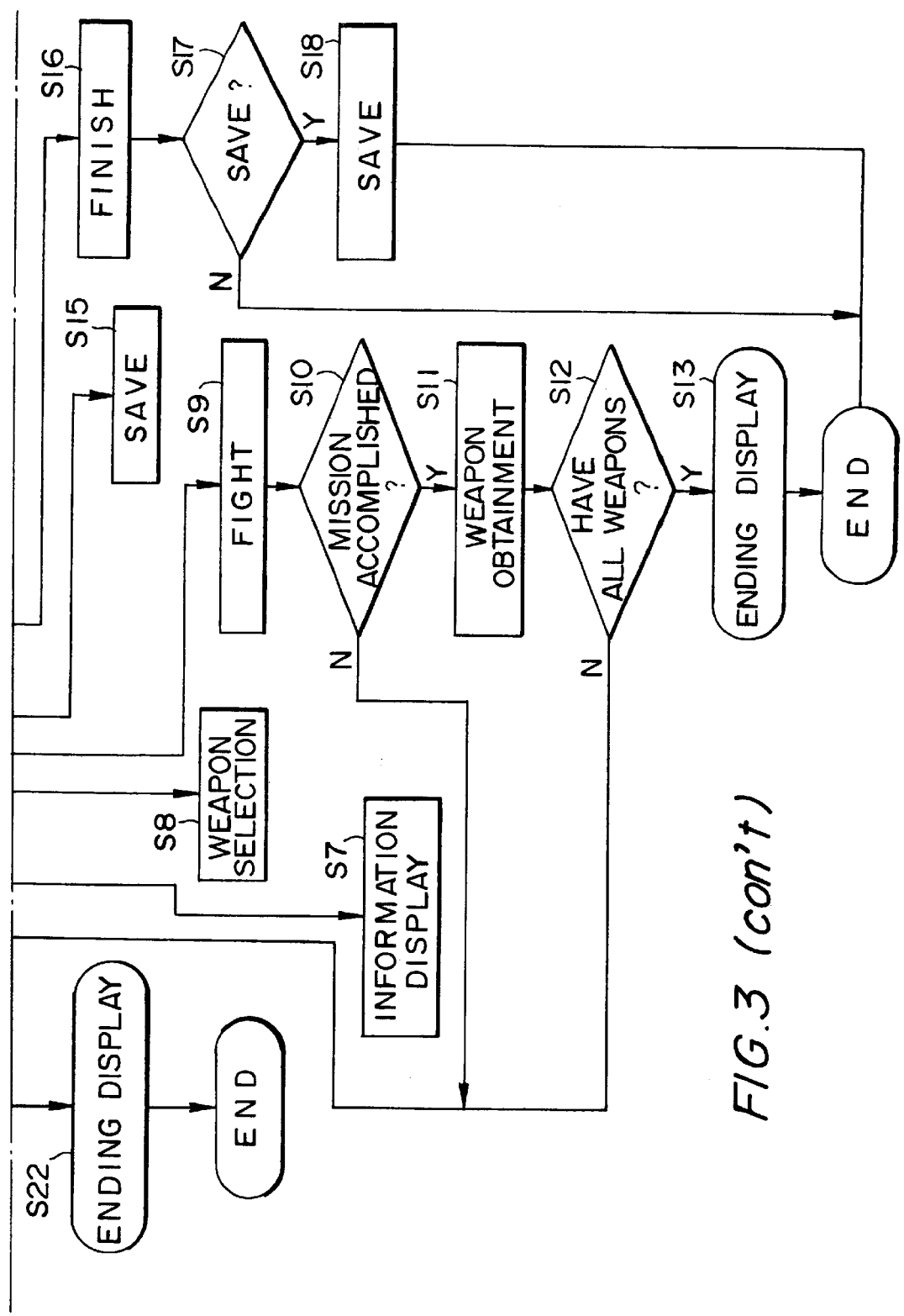
FIG.3 (con't)

SPECIAL
TECHNIQUE C

FIG. 13

| PARAMETER \ WEAPON | WEAPON A | WEAPON B | WEAPON C | --- |
|---|---|---|---|---|
| OFFENSIVE POWER | 10 | 12 | 6 | --- |
| DESTRUCTIVE POWER | 8 | 12 | 6 | --- |
| PUSHING POWER | 8 | 10 | 8 | --- |
| ON-HIT FREEZING TIME | 7 | 11 | 9 | --- |
| ON-GUARD FREEZING TIME | 6 | 11 | 9 | --- |
| DURABILITY | 12 | 8 | 14 | --- |
| RECOVERING POWER OF DURABILITY | 12 | 8 | 14 | --- |
| CONSUMPTION OF DURABILITY ON USE OF SPECIAL TECHNIQUE | 8 | 12 | 5 | --- |

GAME MACHINE AND INFORMATION STORAGE MEDIUM

TECHNICAL FIELD

The present invention relates to a game device and an information storage medium suitable for use in the game device.

BACKGROUND ART

In a fighting game which is one of many competition games, a player enjoys the game while controlling a game character on a screen so that it will fight against an enemy game character controlled by a computer or another player. Such a fighting game is very popular since players can feel as if they actually fight against each other.

In such a fighting game, a player first selects a desired game character and controls it to fight with an enemy game character. If the player's game character defeats the enemy game character, the player can advance to the next game stage in which the player's game character will fight against a new enemy game character. In such a manner, the player sequentially fights against a number of enemy game characters through a series of game stages. If the player has fought successfully through all the game stages, the ending display is performed to finish the game. Thus, the player can be more enthusiastic for the game by sequentially causing the player to clear the series of game stages so that the player will take all the fun out of the stories in the game stages.

In the prior art fighting game, however, once the player has used a selected game character and cleared all the game stages, the player would lose interest and not use the same game character again. This raises a problem in that the player will not play the same game repeatedly.

To overcome such a problem, an object of the present invention is to provide a game device which can give variety to the fighting game so that the player will be led to play the game repeatedly, and an information storage medium suitable for use in such a game device.

DISCLOSURE OF THE INVENTION

To this end, the present invention provides a game device comprising:

means for selecting one of a plurality of modes including a first mode in which a player controls a game character through a given control means to make the game character fight against an enemy game character, and a second mode in which a game for obtaining an item to be used by the game character is played;

means for enabling the game character in the first mode to use the item obtained in the second mode, and for changing at least one of an action of the game character caused by an input by the player and information relating to a fight when the item used by the game character is changed; and means for synthesizing a game image including an image of the game character.

The player can select any one of the first mode in which the player controls a game character to fight against an enemy game character and the second mode in which a game for obtaining an item such as a weapon to be used by the game character is played. If an item is obtained in the second mode, the game character can use that item in the first mode. Depending on the item, the action of the game character as well as the information of the fighting are changed. If the same game character is used, variety can be given to the fighting game by changing the type of item. Thus, the player can be led to play the game repeatedly.

An item used by a game character may be changed by changing an object representing the item, when the game character is also represented by a plurality of objects.

By changing the item-representing object, the image of the game character can be varied and variety can be given to the game images.

Therefore, it is desirable that the present invention is applied to a three-dimensional game device in which a field-of-view image as seen from a given viewpoint within the object space can be synthesized. Unlike two-dimensional game devices, the three-dimensional game device can change the item in the game character in a simple way such as changing the item-representing object.

A map showing a plurality of points and information relating to an item obtainable at each of the points may be displayed for the player in the second mode.

Thus, a story can be provided on obtaining the item. This can lead the player to be enthusiastic about obtaining the item.

In the second mode, a fight which is performed between the game character controlled by the player and the enemy game character to obtain an item may be a different type of fight from the fight in the first mode.

In the second mode, for example, the fighting may be performed while changing the degree of difficulty in a step manner depending on the progress of the game play or the fighting may be carried out in such a manner that the player can learn the game technique. Thus, the second mode can be used as a game operation guidance mode for beginners.

At least one of a basic position of a game character and a series of subsequent actions of the game character may be changed when the item used by the game character is changed.

Thus, the player can enjoy the game play by controlling the game character which performs various actions determined by different items. This provides variety to the fighting game.

At least one of the number and a type relating to a special technique of a game character caused by a given input to the control means may be changed when the item used by the game character is changed.

The game character may use special techniques by getting special items, for example. This can give variety to the fighting game and at the same time cause the player to be more enthusiastic about obtaining the item in the second mode. Thus, the player may be led to play the game repeatedly.

The item may be a weapon item; and with respect to the weapon item, information relating to at least one of a hit area, offensive power, defensive power, durability, and effect of attack against an enemy game character may be changed when the weapon item used by the game character is changed.

The game character can obtain any one of weapon items of various performances. This can provide a game which the player will not easily get tired of.

BRIEF DESCRIPTION OF DRAWINGS

FIGS. 2A, 2B and 2C illustrate weapons used by a game character.

FIG. 13 is a data table showing various parameters.

BEST MODE FOR CARRYING OUT THE INVENTION

Preferred embodiment of the present invention will now be described with reference to the drawings.

Figure 1:
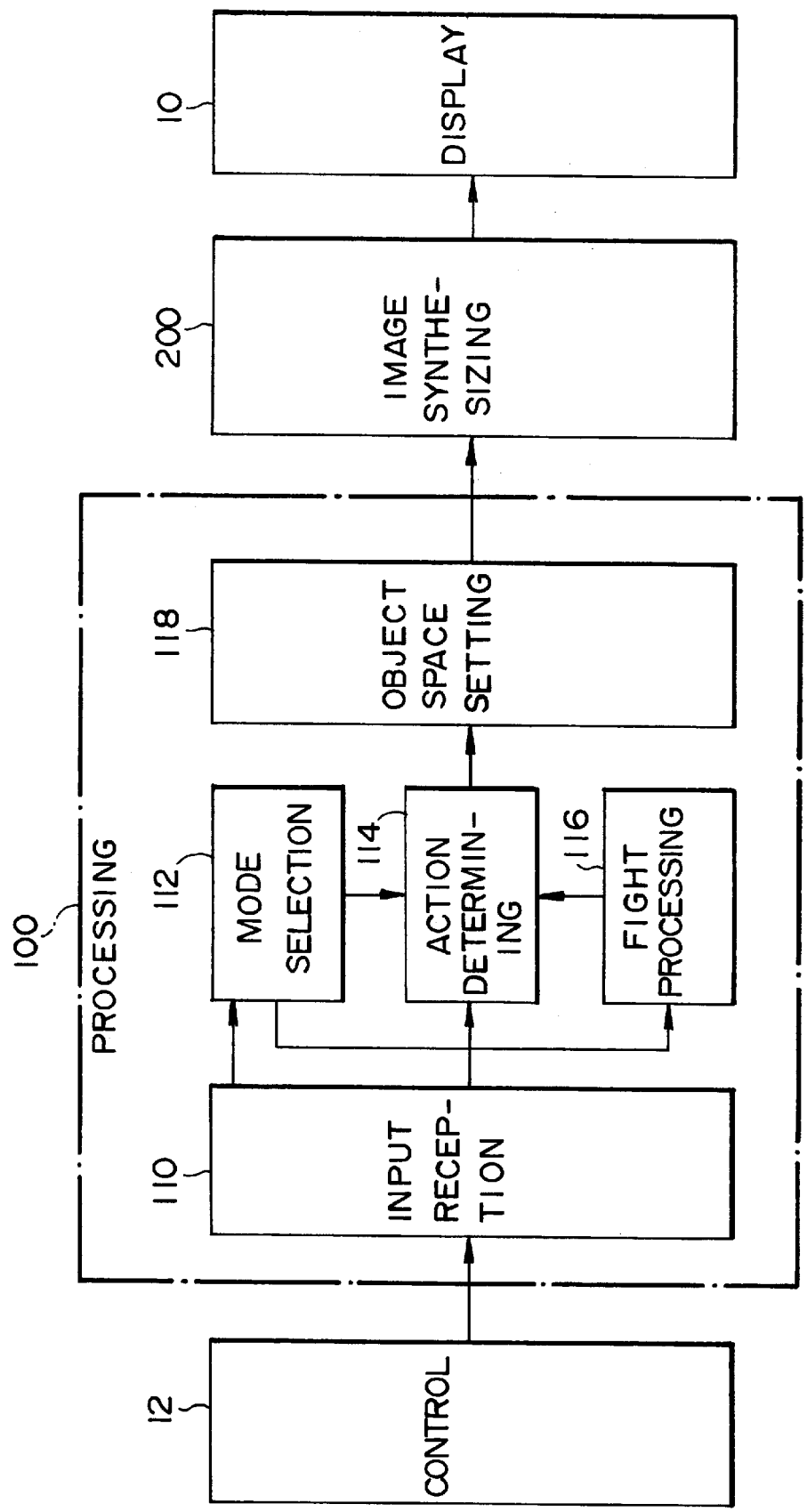
FIG. 1 is a functional block diagram of one embodiment of the present invention.

FIG. 1 is a functional block diagram of the embodiment of the present invention. A control unit 12 receives control information through levers, buttons and so on which are manipulated by a player. The control information is then outputted from the control unit 12 toward a processing unit 100. The processing unit 100 performs various processings such as executing of programs, setting of modes, positioning of objects to be displayed and so on, based on a given program and the control information. The processing unit 100 can be configured by CPU and memories. An image-synthesizing unit 200 synthesizes game images based on the results from the processing unit 100. The image-synthesizing unit 200 can be configured by ASIC exclusively used to synthesize images or CPU and memories. Images generated by the image-synthesizing unit 200 are outputted toward a display unit 10 wherein they are displayed.

The processing unit 100 comprises an input reception section 110, a mode selection section 112, an action determination section 114, a fight processing section 116 and an object space setting section 118.

The input reception section 110 receives the control information inputted by the player through the control unit 12.

In the present embodiment, there is provided a normal game mode (first mode) in which a game character controlled by the player through the control unit 12 fights against an enemy game character controlled by a computer or another player. There is also provided a weapon obtaining mode (second mode) in which the player plays a game for obtaining a weapon to be used by the game character. The mode selection section 112 performs processing for the player to select any one of a plurality of modes including the normal game mode and the weapon obtaining mode, based on the control information received by the input reception section 110. More particularly, the mode selection section 112 processes data for setting a mode selection screen in which any one of the normal game mode and weapon obtaining mode can be selected. Such data is then used in the image-synthesizing unit 200 to generate a mode selection screen.

The action determination section 114 determines the action of the game character displayed on a screen, based on the control information received by the input reception section 110. In the present embodiment, there has been previously provided information of motion relating to game characters, each of which is formed by a plurality of objects. This motion information includes information for specifying changes in the positional and directional information of each of the objects when the corresponding game character moves. The motion information corresponding to the control information from the control unit 12 is selected and used to move the game character. For example, if the control information for causing the game character to swing a sword is inputted, the motion information for causing the game character to perform a series of actions through which the game character swings the sword up and down and then returns to its basic position will be selected.

The fight processing section 116 performs various processings relating to fights between the player's game character and the enemy game character. More particularly, the fight processing section 116 performs hit checking, setting of various parameters in the fight, calculation of the damage and freezing time in the game character, calculation of the durability in the weapon and so on. The results from the fight processing section 116 reflect on the determination of action in the action determination section 114.

The object space setting section 118 places objects on the object space based on the results from the action determination section 114. More particularly, the object space setting section 118 updates the identification information of objects (object number) arranged within the object space and the object information including the positional and directional information of the objects for every frame. Thus, the image synthesizing unit 200 will synthesize a field-of-view image as seen from a given viewpoint within the object space, based on the object information set by the object space setting section 118.

If the player obtains a weapon in the weapon obtaining mode, the present embodiment enables that weapon to be used in the normal game mode. As shown in FIG. 2A, a game character in the present embodiment may be formed by a plurality of objects. When it is wanted to change the weapon of the game character, identification information of the object representing the weapon is changed from OB1*a* to OB1*b*, as shown in FIGS. 2B and 2C. Thus, the same game character can have different weapons. This can give variety to the game images.

When the weapon is changed, the action of the same game character caused by the same input from the player can be also changed. More particularly, when the player operates levers and buttons in certain order, the action determination section 114 causes the game character to perform a first action if the game character has a first weapon, or to perform a second action if the game character has a second weapon. Thus, the different actions can be carried out depending on the weapon used by the same game character. This can give variety to the game.

When the weapon is changed, moreover, information given to the same game character relating to a fight is also changed. For example, a game character having a first weapon differs from the same game character having a second weapon in the hit area or other parameters. The fight processing section 116 changes these settings.

The present invention is desirably applied to a three-dimensional game device which can synthesize a field-of-view image as seen from a given viewpoint within the object space. With a two-dimensional game device, N sets of images consisting of a game character and a weapon must be provided if it is wanted for the game character to have N types of weapons. On the contrary, the three-dimensional game device can have common objects forming a game character and only N types of objects representing N types of weapons. Thus, the same game character can have N types of weapons. Furthermore, the same game character can take different actions depending on the weapon mounted thereon, for example, only through a simple technique wherein the motion information is changed from one to another.

The operation of the present embodiment will now be described with reference to a flow chart shown in FIG. 3.

Figure 4A:
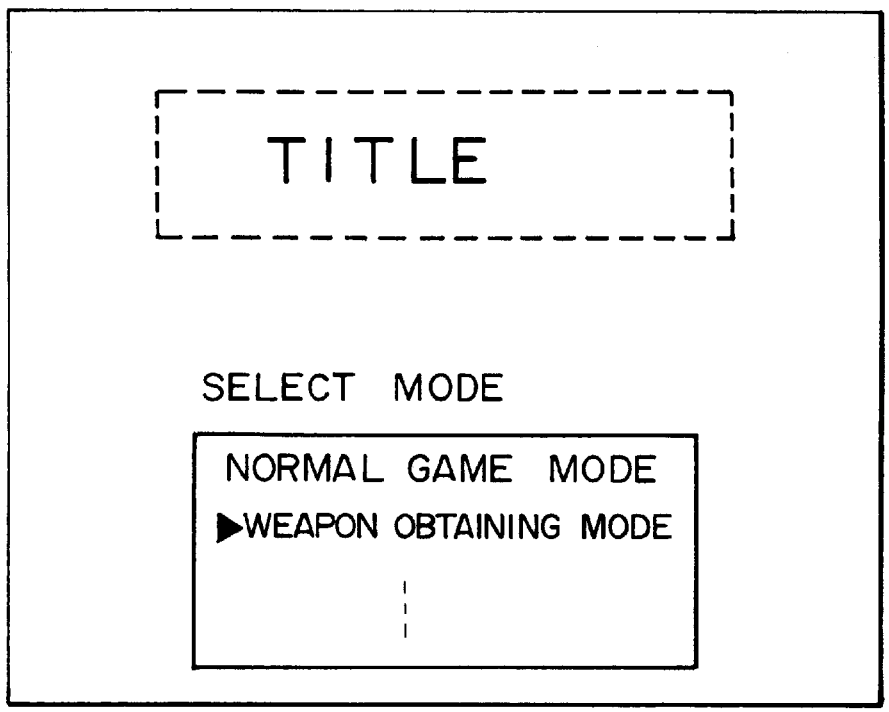
FIGS. 4A and 4B are a mode selection screen and a map screen, respectively.

As the game is started, a mode selection screen as shown in FIG. 4A is first displayed (Step S1).

If the player selects the weapon obtaining mode through the control unit 12, the mode selection section 112 switches the play mode to the weapon obtaining mode (Step S2). A game character selection screen is then displayed, the player selects a game character, and it is judged whether the data relating to weapon obtaining operation by the selected game character has been already saved (Steps S3 and S4). If not saved, it is determined that the transition to the weapon obtaining mode is for the first time for the selected game character. An opening image of the weapon obtaining mode for the selected game character is then displayed (Step S5).

Figure 4B:
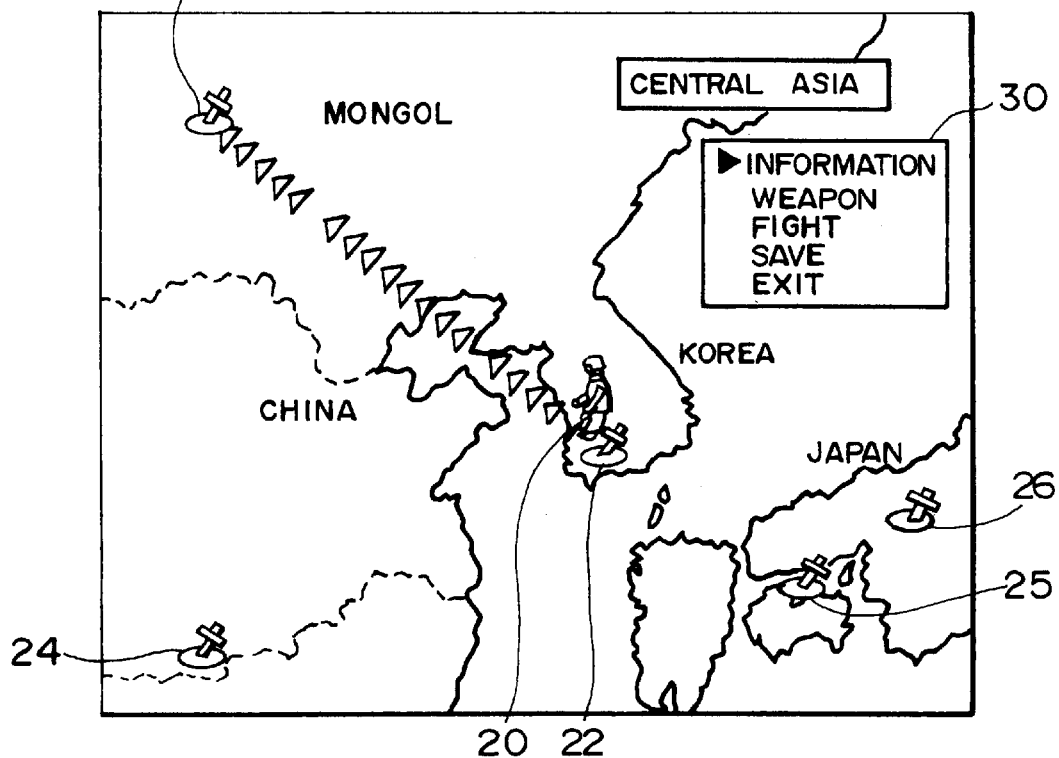

If the data has been already saved or if the opening image display has terminated, a map as shown in FIG. 4B is displayed and the program proceeds to a map mode (Step S6). As can be seen from FIG. 4B, a plurality of points 22–26 are set on the map. The player moves the game character 20 between the points on the map in the map mode. For example, in FIG. 4B, the game character 20 is to be moved from a point set in Korea to another point set in Mongol . In the present embodiment, each game character has its own start point on the map. For example, Japanese game character has a start point set in Japan while Chinese game character has a start point set in China. Maps for Europe, U.S.A. and other countries are also provided. For example, European and American game characters may initiate the weapon obtaining mode at points set in Europe and U.S.A., respectively.

Figure 5A:
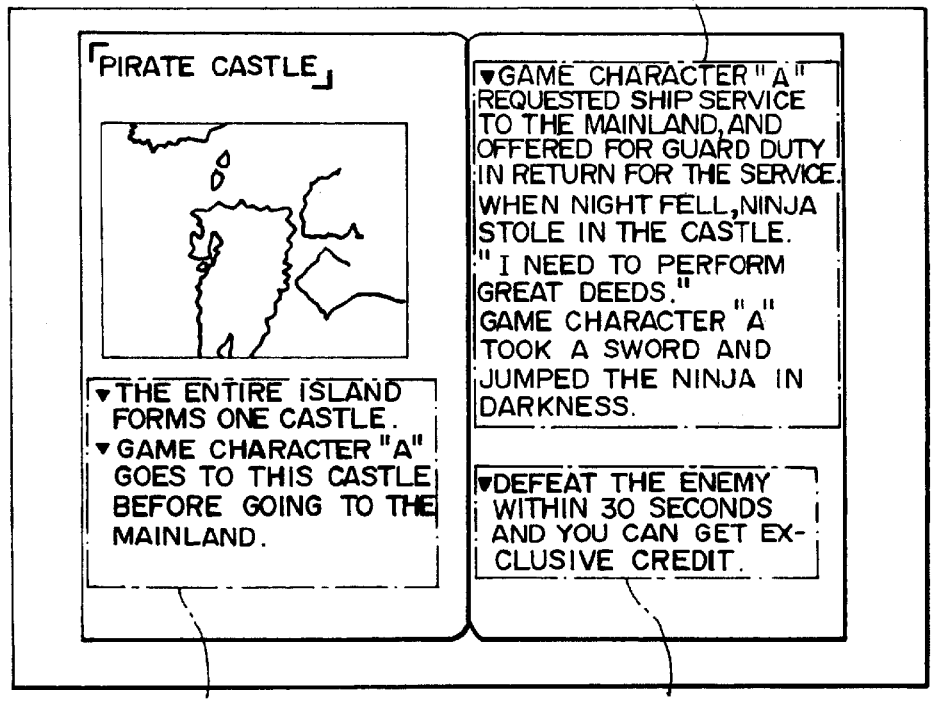
FIGS. 5A and 5B are screens showing information relating to a weapon.

If the player selects information display through a selection window 30, information relating to weapons obtainable at the point whereat the game character 20 is positioned is displayed for the player (Step S7). FIG. 5A exemplifies information displayed when the game character 20 is positioned at a point 25 (Shikoku in Japan). A display area 32 shows information of the locality of that point; a display area 33 shows a story relating to that point; and a display area 34 shows information of a mission charged to the player at that point. In FIG. 5A, the player is charged with a mission that the player must upset the enemy game character within 30 seconds.

Figure 5B:
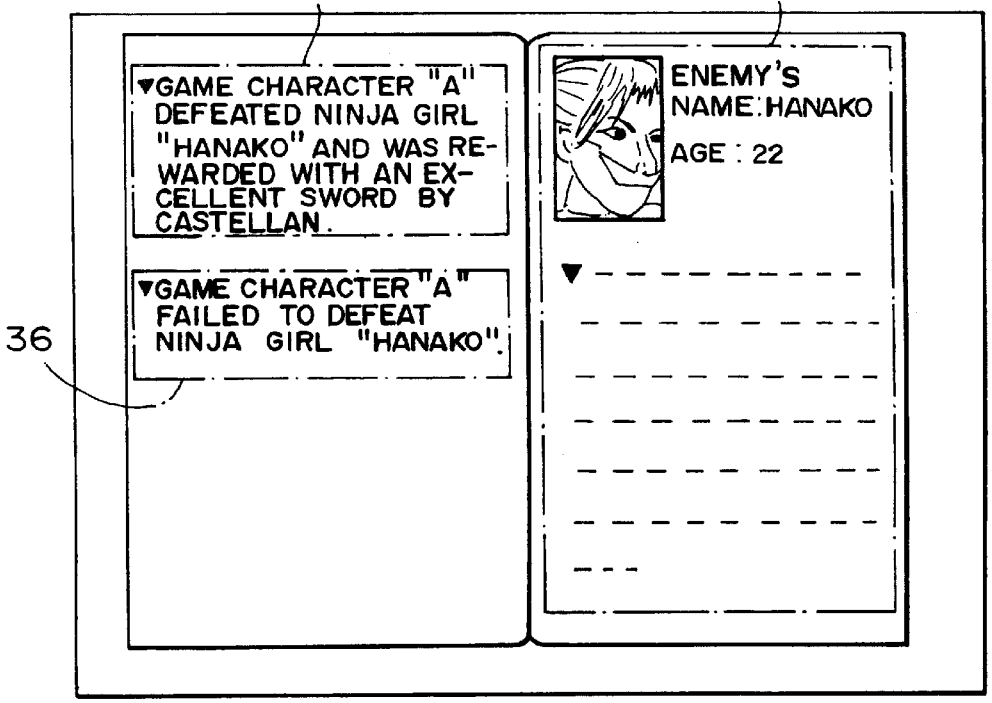

FIG. 5B exemplifies information displayed for the player after the mission has ended. A display area 35 shows information if the player has completed the mission, while a display area 36 shows information if the player has failed. A display area 37 shows information relating to the enemy.

As shown in the display area 35, the player can obtain a new weapon, "Masamune" after the mission has been completed. The weapon can be used in the normal game mode.

In such a manner, various information relating to the items obtained at the respective points may sequentially be displayed for the player depending on the progress of the game. This can make the player enthusiastic for obtainment of the weapons to play the game repeatedly.

Figure 3:
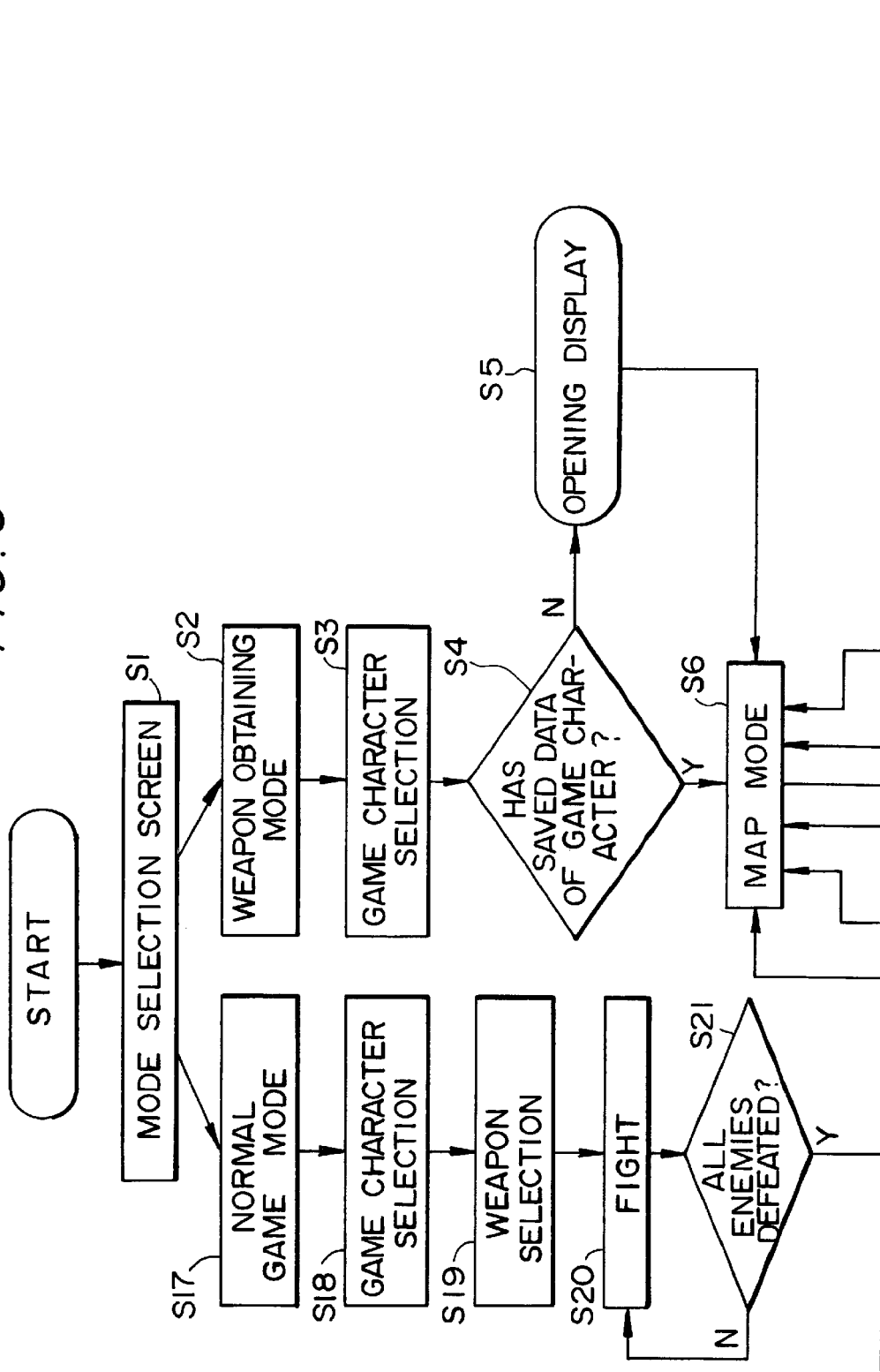
FIG. 3 is a flow chart illustrating an operation in the present embodiment.

When it is wanted to initiate the charged mission, the player selects "fight" in the selection window 30 of FIG. 4B (Step S9 in FIG. 3). A fight between the player's game character and the enemy game character is then initiated. If the player has successfully accomplished the mission through the fight, the player can obtain a new weapon (Steps S10 and S11). In such a manner, the weapon obtaining mode of the present embodiment enables the player to obtain a weapon through the fight between its own game character and an enemy game character. If all the weapons have been obtained, an ending image for the weapon obtaining mode of the player's game character is displayed (Steps S12 and S13).

Figure 6:
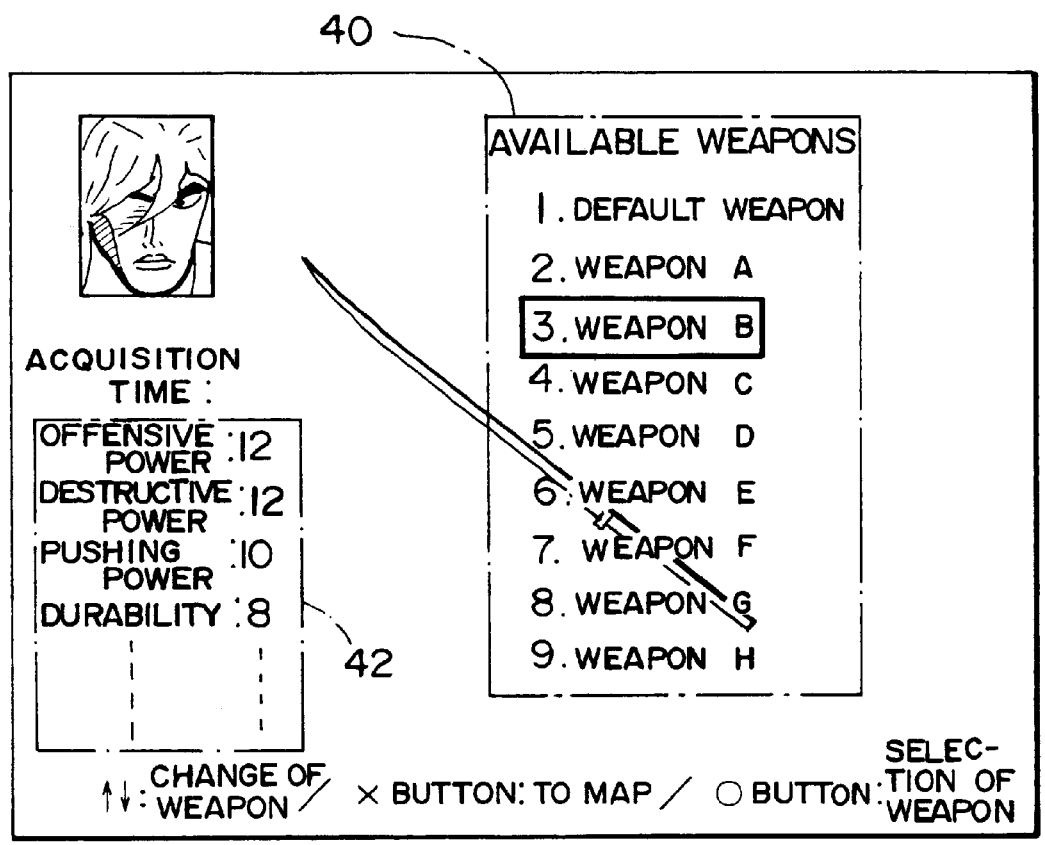
FIG. 6 is a weapon selection screen.

In the present embodiment, the player can select a desired weapon to be used in this fight. In such a case, the player selects a weapon in the selection window 30 of FIG. 4B (Step S8). A weapon selection screen as shown in FIG. 6 is then displayed. In the weapon selection screen, a display area 40 shows the weapon provided at the start and obtained weapons for the player's game character. The player selects a desired weapon from these weapons. After the player has selected the desired weapon, various information relating to that weapon is displayed for the player, as shown in a display area 42.

If it is desired to save the data relating to the player's game character, "Save" is selected in the selection window 30 of FIG. 4B (Step S15). If it is wanted to finish the game, "Finish" is selected in the selection window 30 (Step S16). The game finishes after it has inquired whether or not the data is to be saved (Steps S17 and S18).

According to the present embodiment, the player can perform the weapon obtaining mode in a manner different from that of the normal game mode. More particularly, the degree of difficulty in the mission charged to the player in the weapon obtaining mode can be changed step by step depending on the progress of the weapon obtaining mode. Further, the player can be charged with any one of the other missions different from the mission charged to the player in the normal game mode (e.g., defeating the enemy game character over a given number of times within a limited time period). Thus, a game operation guidance for beginners can be realized using the weapon obtaining mode.

Figure 7A:
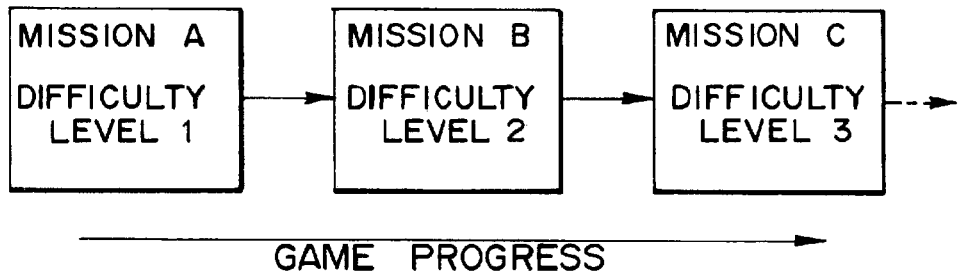
FIGS. 7A, 7B and 7C are views illustrating a technique by which the fighting in the weapon obtaining mode is changed to a different one from the fighting in the normal game mode.
Figure 7B:
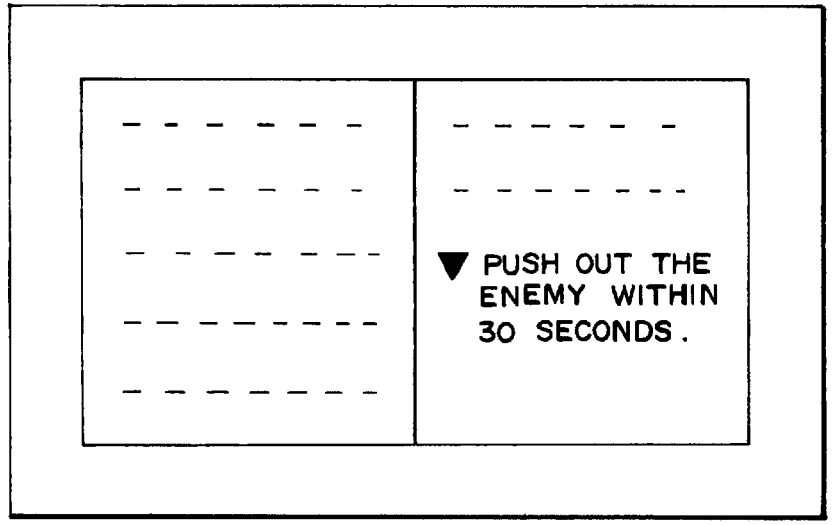
Figure 7C:
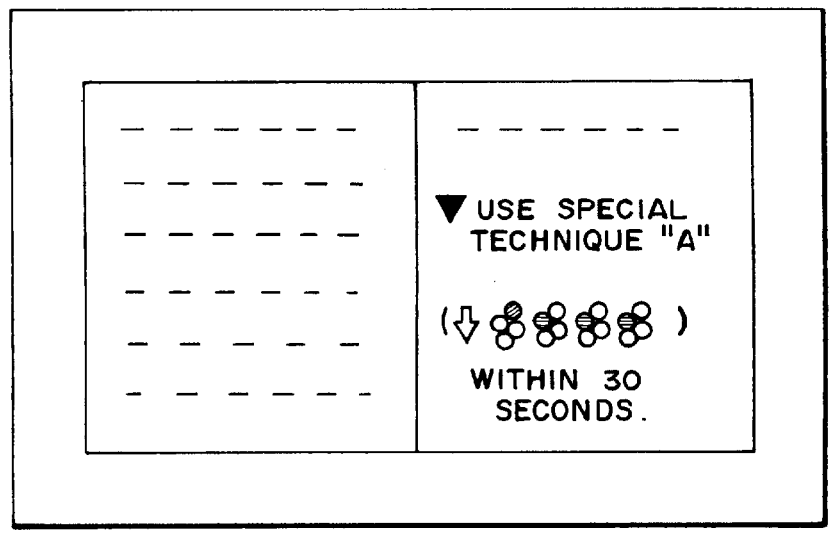

As shown in FIG. 7A, for example, the degree of difficulty in a mission initially charged to the player may be lower. As the player sequentially performs a plurality of missions, the degree of difficulty may gradually be increased. Thus, a beginner who would hesitate such a type of game due to its difficulty can dive into the game without resistance. As shown in FIG. 7B, the player may be charged with a mission wherein the player must push the enemy game character out of the fighting field within a limited time period. In such a mission, the player can learn a technique by which the player's game character can successfully push out the enemy game character. As shown in FIG. 7C, furthermore, the player may be charged with a mission wherein the player must use its own special technique within a limited time period. This can cause the player to learn how to use the special technique.

Figure 8:
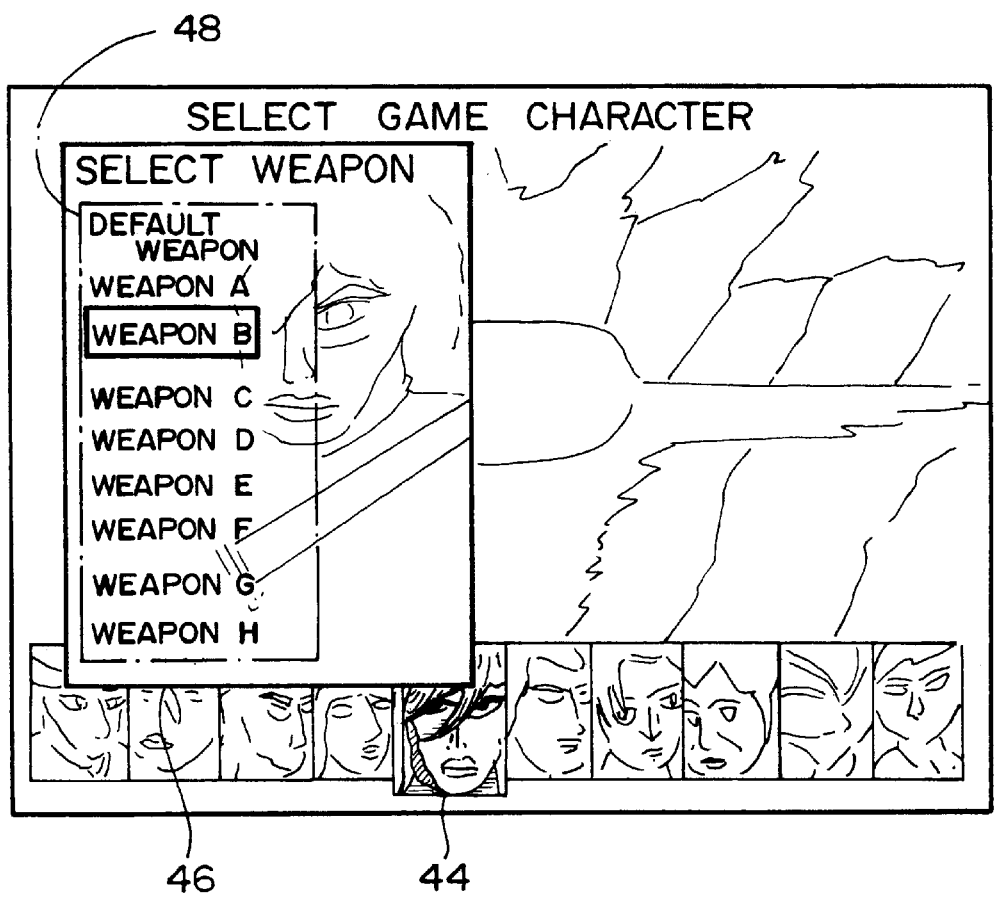
FIG. 8 is a game character selection screen.

The normal game mode in the present embodiment will now be described. If the normal game mode is selected in the mode selection screen of FIG. 4A (Steps S1 and S17 in FIG. 3), a game character selection screen as shown in FIG. 8 is displayed. If the player selects a desired game character 44 in the game character selection screen (Step S18), a weapon selection window 46 is displayed. A display area 48 shows the weapon provided at first and the weapons obtained in the weapon obtaining mode for that game character. The player selects a desired weapon from these listed weapons and initiates the fight against the enemy game character (Steps S19 and S20).

Figure 9A:
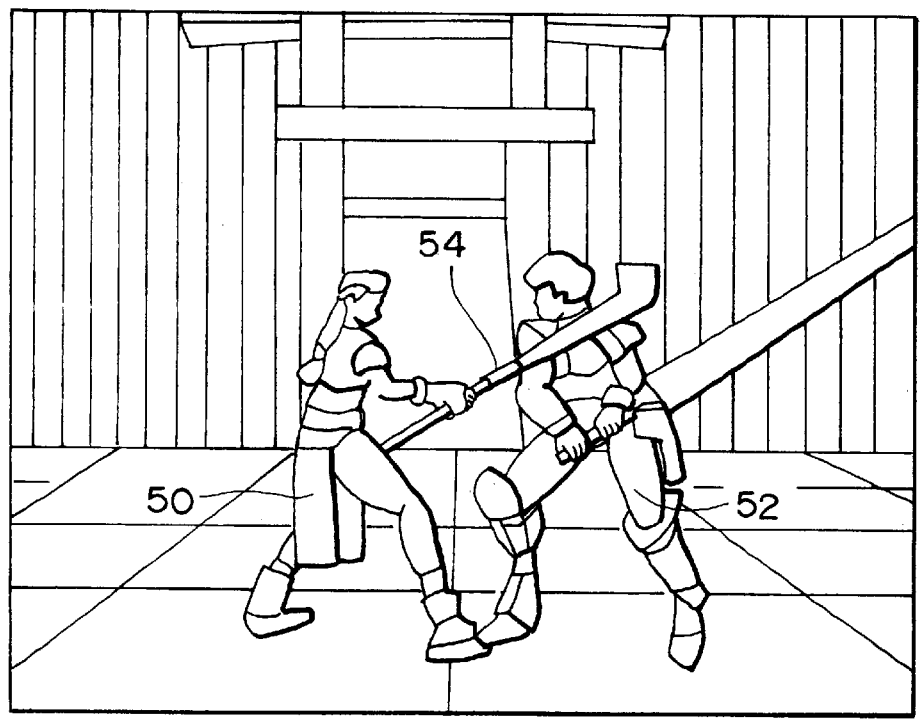
FIGS. 9A and 9B are game images in the normal game mode.
Figure 9B:
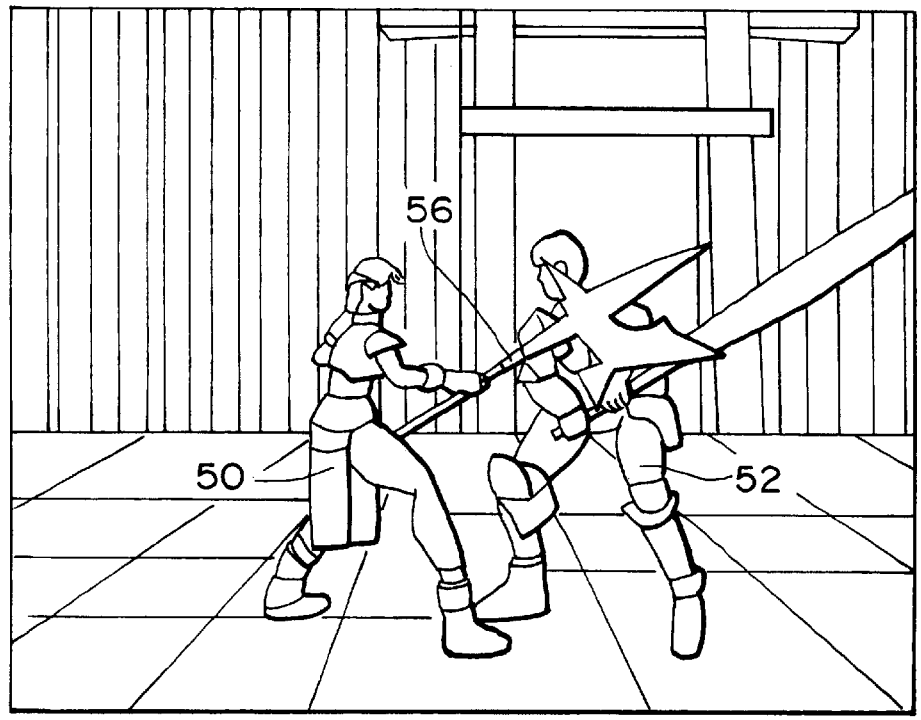

FIG. 9A shows a game image in the normal game mode. The player controls a game character 50 selected by the player through the control unit 12 to perform a fight against an enemy game character 52. On the other hand, FIG. 9B shows a game image wherein the weapon 54 held by the player's game character 50 is changed to another weapon 56. The change of weapon from one to another can be performed, for example, as by changing the identification number of the object representing the weapon.

In the normal game mode, if the player's game character has defeat the enemy game character, the program proceeds to the next game stage wherein the player's game character will fight against a new enemy game character. If all a series of game stages are cleared by fighting against and successfully defeating subsequent enemy game characters, an ending image is displayed and the game finishes (Steps S21 and S22).

According to the present embodiment, one game character can move and fight in various different manners by changing the weapon. Thus, a game consisting of a series of game stages may be changed in content. This provides variety to the fights in the normal game mode. As a result, the player can be led to play the game repeatedly. If the player cannot possibly clear a game stage due to a powerful enemy game character, for example, the player can obtain a more powerful weapon in the weapon obtaining mode to defeat that enemy and can clear the game stage. According to the present embodiment, therefore, a novel interest of seeking out a weapon for clearing the game can be added to a normal fighting game.

There will be described in detail changing of the action of the same game character caused by the same input by the player depending on the weapon used by the game character.

Figure 10A:
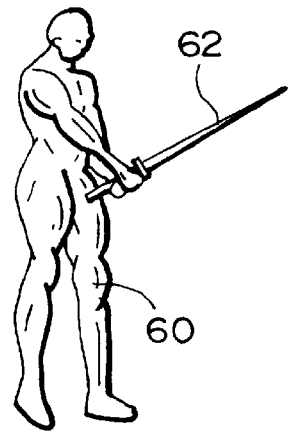
FIGS. 10A–10F are views illustrating a technique by which the basic position and a series of subsequent actions are changed depending on the weapon used by the game character.
Figure 10B:
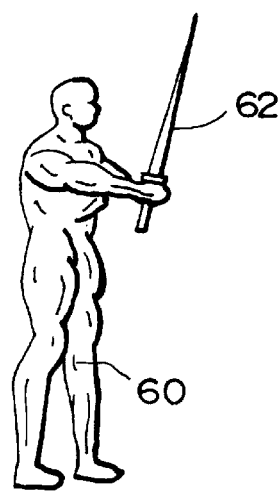
Figure 10C:
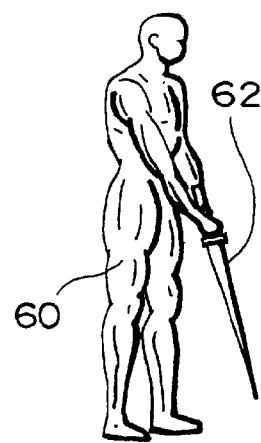

For example, when the player instructs a player's game character to swing a sword through the levers and buttons in the control unit 12, the player's game character 60 swings the sword 62 up and down from the basic position and returns back to the basic position, as shown in FIGS. 10A, 10B and 10C. FIG. 10A shows the basic position of the game character 60 while FIGS. 10B and 10C show a series of actions subsequent to the basic position. After the action of FIG. 10C, the game character returns back to the basic position of FIG. 10A.

Figure 10D:
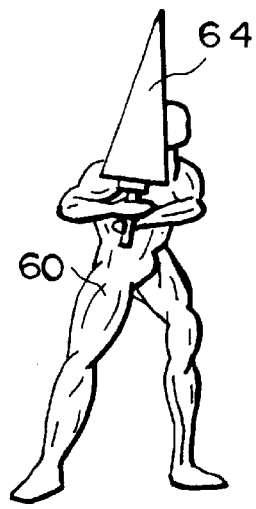
Figure 10E:
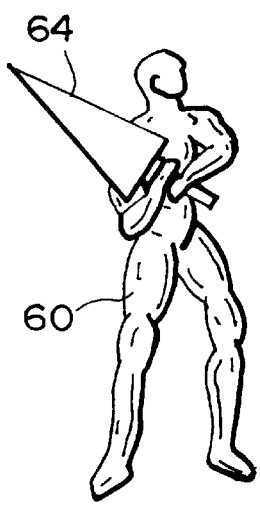
Figure 10F:
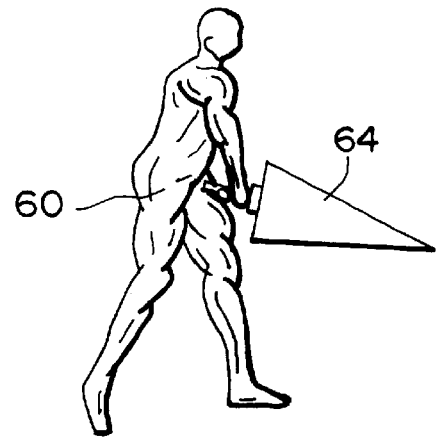

On the other hand, FIGS. 10D, 10E and 10F show the other basic position of the game character 60 when the sword 62 has been changed to another type of sword 64 and a series of actions subsequent to the basic position. As will be apparent from comparison between FIGS. 10A and 10D, the game character 60 having a different weapon is also different in its basic position. As will also be apparent from comparison between FIGS. 10B, 10C and FIGS. 10E, 10F, a series of actions subsequent to the basic position is also different. Only one of the basic position and the set of actions may be different. This process can be accomplished by the action determination section 114 of FIG. 1 selecting motion information different from that of the previously selected weapon.

Figure 11A:
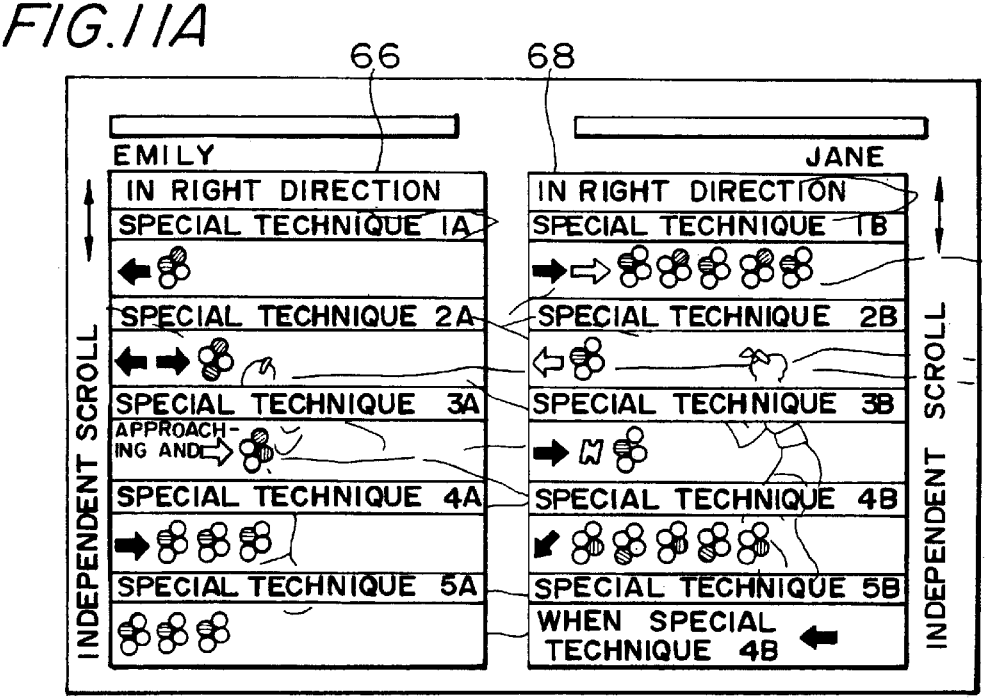
FIGS. 11A–11D are views illustrating changing of the type and number of special techniques depending on the weapon used by the game character.
Figure 11B:
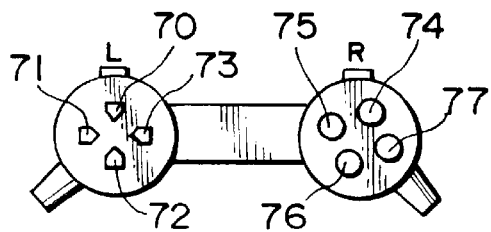
Figure 11C:
Figure 11D:
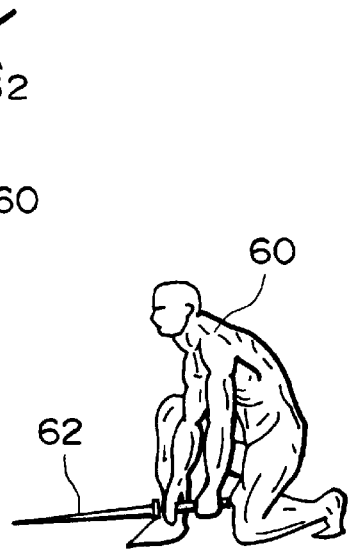

When the weapon used by the game character is changed, the special technique of the same game character caused by a given input to the control unit 12 can be also changed. For example, the number of special techniques, or the type of special technique may be changed. As shown in FIG. 11A, tables 66 and 68 showing special techniques may be displayed during play in the normal game mode. As will be apparent from these tables 66 and 68, each game character has a plurality of special techniques depending on its characteristic. The special techniques may be used by operating direction keys 70–73 and buttons 74–77 on a game controller shown in FIG. 11B with a given procedure. For example, FIG. 11C shows that a special techniques C can be used by pressing the direction key 72 before pressing button 74, and then pressing the button 75 three times. If such a series of operations is successfully performed with a given time interval, a special technique delivering a deathblow after jumping can be used as shown in FIG. 11D.

The number and type of special techniques may be changed when the sword 62 of the game character 60 is changed to the other sword 64 as shown in FIG. 10D. For example, if the game character obtained a certain fabulous sword, the game character may use a more powerful technique or an increased number of techniques. Such a process can be accomplished by the action determination section 114 when it changes motion information (which specifies the motion of the special technique) for different weapons.

Figure 12A:
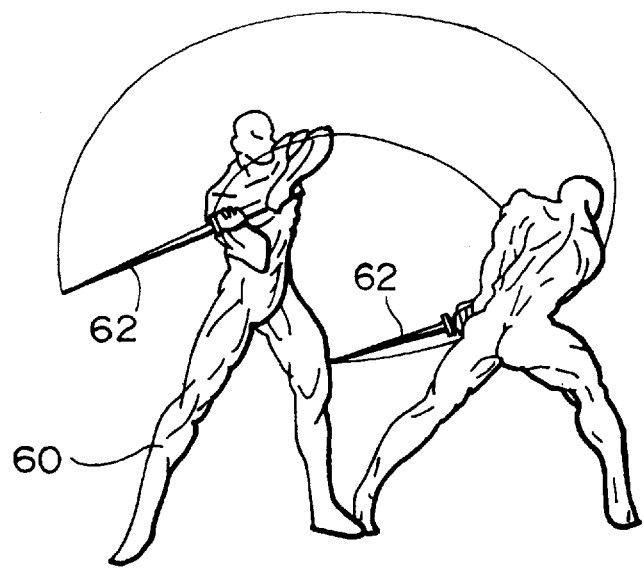
FIGS. 12A–12D are views illustrating changing of the hit area depending on the weapon used by the game character.
Figure 12B:
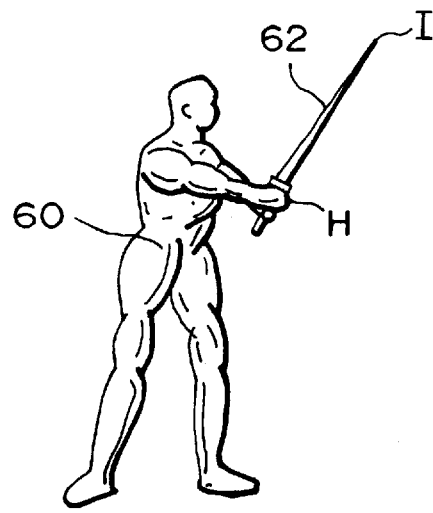
Figure 12C:
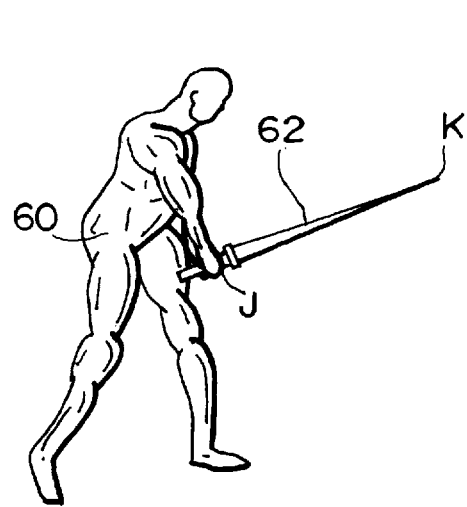
Figure 12D:
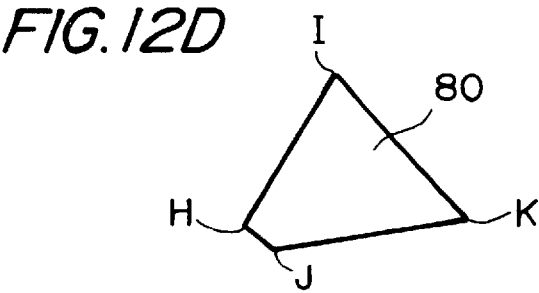

The hit area of the weapon may be differed depending on the weapon used by the game character. As shown in FIG. 12A, for example, the following hit check may be made when the game character 60 has swung the sword 62. It is now assumed herein that the guard and point of the sword 62 held by the game character 60 are at points H and I in FIG. 12B. It is also assumed that the guard and point of the sword 62 are displaced to points J and K after a given time period (e.g., one frame) as shown in FIG. 12C. At this time, the present embodiment may model the sword 62 from line segments and generate a plane 80 containing line segments HI and JK as shown in FIG. 12D. Such a plane 80 is used to perform the hit check. More particularly, the hit check may be made by determining whether there is an intersection between the plane 80 and a hit area set in an enemy game character or another plane similarly generated by a sword swung by the enemy game character. If a player's game character has a different sword, the shape of the sword may be changed. For example, a longer sword may causes the length of the line segment HI to be increased while a shorter sword may cause the length of the line segment HI to be reduced. Thus, the shape of the sword may influence result of fight. More particularly, a game character having a longer sword can attack an enemy game character while maintaining a larger distance. This is advantageous for the fight.

Furthermore, the game character may obtain different information about offensive power, defensive power and durability of the weapon, and the effect of attack against the enemy game character, depending on the weapon used by the game character. More particularly, each of the game characters may have its own data table in which such various parameters about weapons as shown in FIG. 13 have been set.

In this table, the offensive power is a parameter for determining an amount of damage against the enemy game character. If this parameter is larger, the player's game character can increase the damage against the enemy game character with a reduced number of actions. The offensive power may also be changed when the weapon held by the player's game character is changed, as shown in FIG. 13.

The destructive power is a parameter for determining an amount of damage against the weapon held by the enemy game character. If this parameter is larger, the weapon of the player's game character can more easily destroy the weapon of the enemy game character and at the same time reduce the number of times at which the special technique of the enemy game character is used.

The pushing power is a parameter for determining a distance through which the enemy game character is pushed back when an attack from the player's game character hits the enemy game character or when the enemy game character guards an attack from the player's game character. If the pushing power is larger, the probability at which the enemy game character is pushed out of a ring is increased. If the pushing power is smaller, a chance of close combat will be increased.

The on-hit and on-guard freezing times are parameters for determining time periods during which the enemy game character is frozen when the attack hits the enemy game character and when the enemy game character guarded the attack. These freezing times show the effect of attack against the enemy game character. If these parameters are larger, a chance of counterattack from the enemy game character is decreased. If these parameters are smaller, the player's game character tends to receive the counterattack from the enemy game character.

The durability and recovering power of durability are parameters for determining the degree of damage to the weapon when the player's game character guards the attack from the enemy game character and for determining the degree of recovery of the durability of the weapon when a new round of fight is initiated. If these parameters are larger, the weapon of the player's game character is hardly destroyed. If these parameters are smaller, the weapon of the player's game character is easily destroyed, so that the player's game character would have to fight against the enemy game character without any weapon.

The consumption of durability on use of special technique is a parameter for determining the degree of reduction of durability when a special technique is used. If this parameter is smaller, the number of times the special technique can be used is increased.

The various parameters mentioned above are changed depending on the weapon held by the player's game character, as shown in FIG. 13. Thus, the player can enjoy the fighting game using the same game character with variety.

Figure 14:
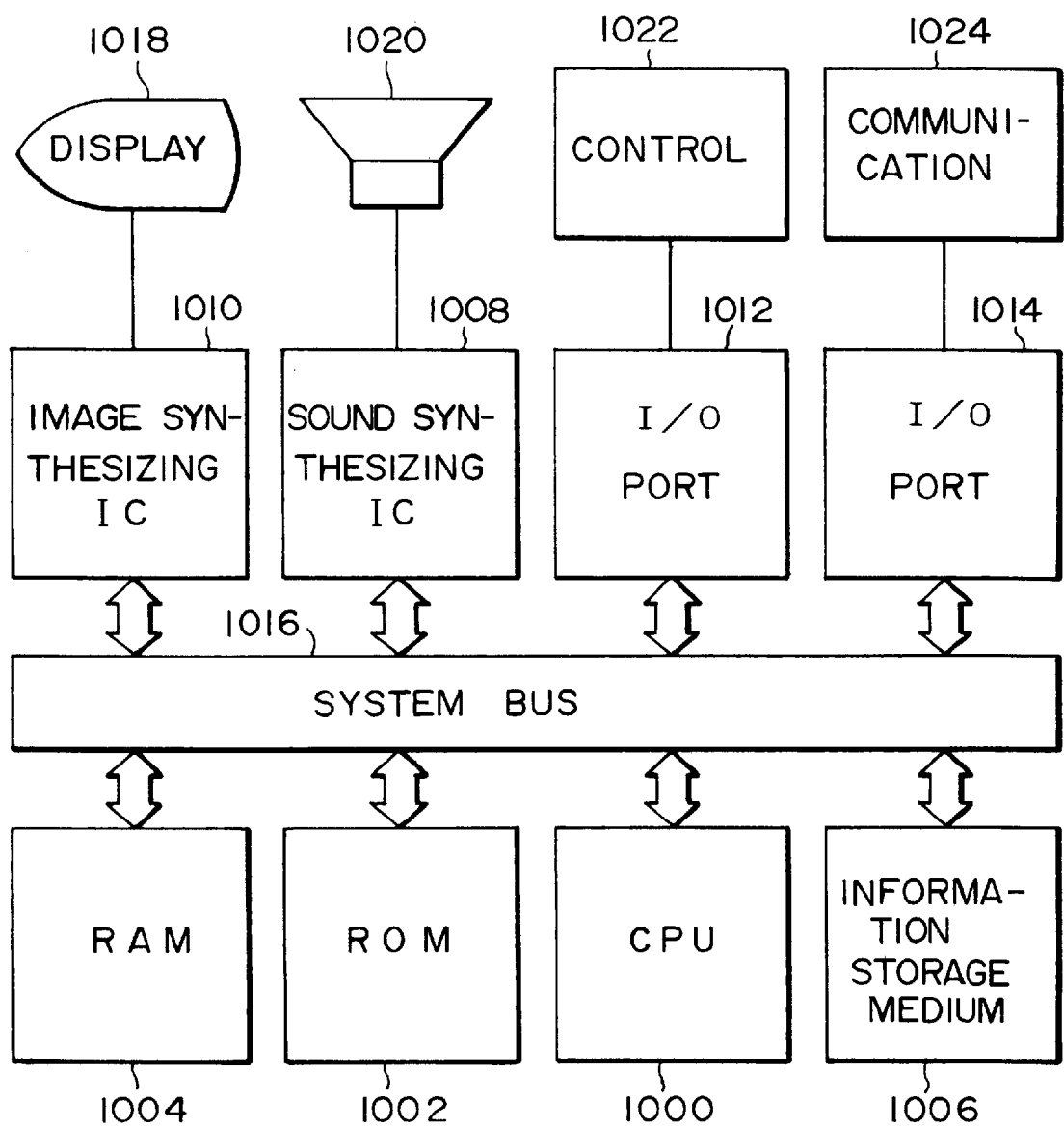
FIG. 14 is a view of hardware usable for realizing the present embodiment.

A structure of hardware which can realize the present embodiment will be described with reference to FIG. 14. The hardware comprises a CPU 1000, a ROM 1002, a RAM 1004, an information storage medium 1006, a sound synthesizing IC 1008, an image synthesizing IC 1010 and I/O ports 1012 and 1014, all of which are interconnected through a system bus 1016 for data transmission/reception. The image synthesizing IC 1010 is connected to a display 1018; the sound synthesizing IC 1008 is connected to a speaker 1020; the I/O port 1012 is connected to a control device 1022; and the I/O port 1014 is connected to a communication device 1024.

The information storage medium 1006 has mainly stored programs and information of images for representing objects to be displayed and so on. The information storage medium 1006 may be in the form of a CD-ROM, game cassette, IC card, digital video disk (DVD), magnet-optical (MO) disk, floppy disk (FD), memory, hard disk or the like. For example, a domestic game device may use a CD-ROM, game cassette, DVD or the like as an information storage medium for storing a game program and so on. An arcade game device may use a memory such as ROM. In such a case, the information storage medium 1006 is the ROM 1002.

The control device 1022 corresponds to a game controller or control panel and is so used that the player inputs the results of judgment into the main device depending on the progress of game.

The CPU 1000 controls the entire system and processes various data according to a system program stored in the ROM 1002 (containing initialization information for the main device) and signals inputted through the control device 1022. The RAM 1004 is a storage means used as a working area or the like for the CPU 1000. This storage means can store the contents of the information storage medium 1006 and ROM 1002 or the results of calculation in the CPU 1000. A structure of data having a logical arrangement such as a data table shown in FIGS. 2C or 13 will be built on this RAM or information storage medium.

The sound and image synthesizing IC's 1008 and 1010 output game sounds and images. The sound synthesizing IC 1008 is an integrated circuit for synthesizing game sounds such as effect sounds and background music from the information stored in the information storage medium 1006 and ROM 1002. These sounds are outputted through the speaker 1020. The image synthesizing IC 1010 is an integrated circuit for synthesizing pixel information to be outputted toward the display 1018 based on the image information send from RAM 1004, ROM 1002, the information storage medium 1006 or the like. The display 1018 may be replaced by a so-called head mount display (HMD).

The communication device 1024 sends and receives various data used within the game system to and from any external means. The communication device 1024 may be connected to any other game device for transmission/reception of information according to the game program or for transmission/reception of the game program and the like through a communication line.

Various processings described in connection with FIGS. 1–2C and 4A–13 can be realized through the information storage medium 1006 which stores a program for performing the process shown in FIG. 3, the CPU 1000 operable according to the program, the image synthesizing IC 1010 and so on. The processings performed by the image and sound synthesizing IC's 1010 and 1008 may be performed in a software manner through the CPU 1000, an all-purpose digital signal processor (DSP) or the like.

Figure 15A:
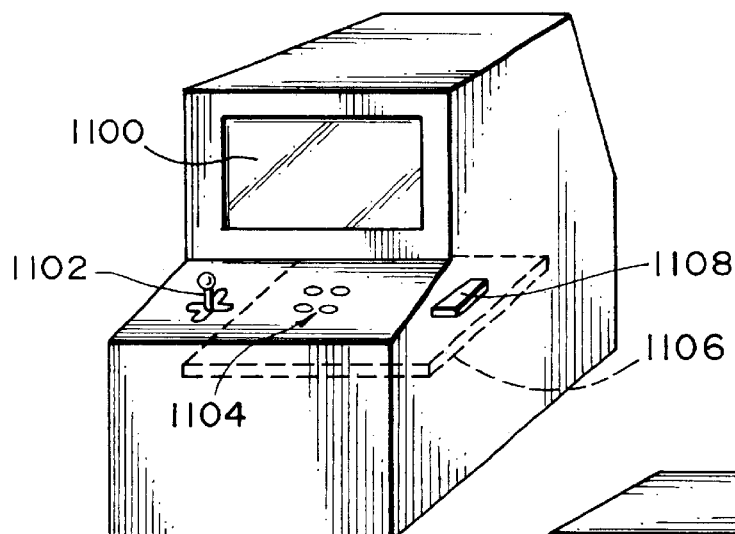
FIGS. 15A, 15B and 15C show machines of various configurations to which the present embodiment can be applied.

FIG. 15A shows an arcade game device to which the present embodiment is applied. A player enjoys a game by manipulating a lever 1102 and buttons 1104 while viewing a game scene on a display 1100. A system board 1106 in the device comprises a CPU, an image synthesizing IC, a sound synthesizing IC and so on. The system board 1106 also comprises an information storage medium or memory 1108 mounted thereon which can store: information for selecting any mode from a plurality of modes including first and second modes; information by which an item obtained in the second mode can be used in the first mode, and by which at least one of an action of a game character and the fighting information can be changed depending on an item used by the game character; information for changing objects representing an item; information for displaying a map including a plurality of points and information relating to an item obtainable at each point on the map; information for performing a different type of fight in the second mode from the fight in the first mode. These information will be called "stored information". These stored information contain at least one of a set of program codes used to perform the aforementioned various processings, image information, sound information, information of object shapes, table data, list data, information of player and so on.

Figure 15B:
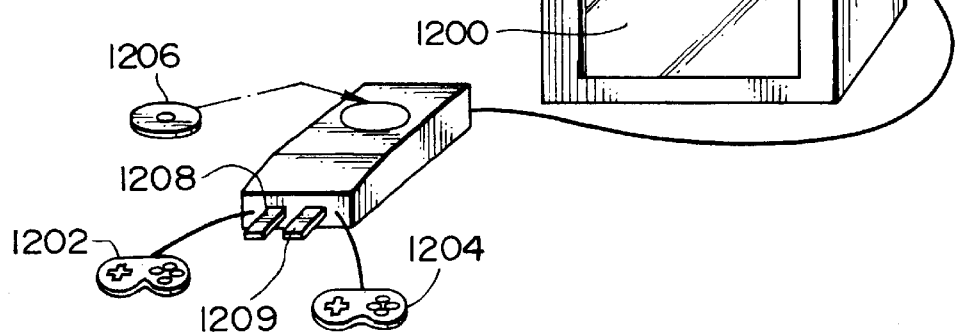

FIG. 15B shows a domestic game device to which the present embodiment is applied. Players can enjoy a game by manipulating game controllers 1202 and 1204 while viewing a game scene on a display 1200. The stored information is within a CD-ROM 1206, IC cards 1208 and 1209 and so on.

Figure 15C:
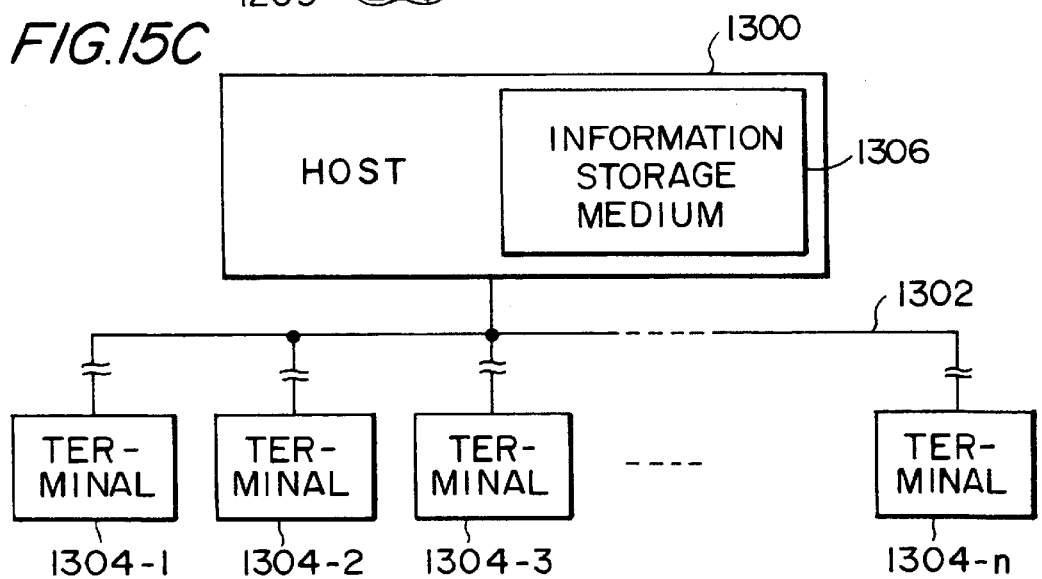

FIG. 15C shows a game device comprising a host device 1300 and terminals 1304-1 through 1304-n connected to the host device 1300 through a communication line 1302, to which the present embodiment is applied. In such a case, the stored information is in an information storage medium 1306 such as a magnetic disc, magnetic tape or memory, which can be controlled by the host device 1300, for example. If each of the terminals 1304-1 to 1304-n is a stand-alone machine having a CPU, an image synthesizing IC and a sound synthesizing IC for synthesizing game images and game sounds, the terminals 1304-1 to 1304-n will receive a game program and the like used for synthesizing game image and game sounds from the host device 1300. On the other hand, if each of the terminals is not a stand-alone machine, the host device 1300 will synthesize game images and game sounds which are in turn outputted toward the terminals 1304-1 to 1304-n for display.

The present invention is not limited to the described and illustrated embodiment, but may be carried out in any of various other forms.

For example, the technique of changing the action of the game character and the information of fighting depending on an item used by the game character is not limited to the aforementioned technique. When the item used by the game character is changed, the game character may have an increased speed on action, a special technique for reducing the power of the enemy game character or an ability of freezing the enemy game character for a longer time, for example.

Although it is desirable that the item used by the game character is a weapon item, such a weapon item may be replaced by a defensive item, racing item or other item.

Although the game to which the present invention is applied is preferably a fighting game in which persons, robots or tanks fight with each other, the present invention may similarly be applied to any other game.

The present invention may further be applied to any game device other than the domestic and arcade game devices such as a simulator, a large-sized attraction system in which a number of players can enjoy a game, a personal computer, a multimedia terminal and a system board for synthesizing images and so on.

What is claimed is:

1. A game device, comprising:
    means for selecting one of a plurality of modes including a first mode in which a player controls a game character through a given control means to make the game character fight against an enemy game character, and a second mode in which a game for obtaining an item to be used by the game character is played;
    means for enabling the game character in said first mode to use the item obtained in said second mode, and for changing at least one of an action of the game character caused by an input by the player and information relating to a fight when the item used by the game character is changed; and
    means for synthesizing a game image including an image of the game character,
    wherein a mode selection screen is displayed before the start of the game play, said mode selection screen being a screen in which the player selects a mode to be played from a plurality of modes including said first mode and said second mode.

2. The game device as defined in claim 1,
    wherein an item used by a game character is changed by changing an object representing the item, when the game character is also represented by a plurality of objects.

3. The game device as defined in claim 1,
    wherein a map showing a plurality of points and information relating to an item obtainable at each of the points are displayed for the player in said second mode.

4. The game device as defined in claim 1,
    wherein in said second mode, a fight which is performed between the game character controlled by the player and the enemy game character to obtain an item is a different type of fight from the fight in said first mode.

5. The game device as defined in claim 1,
    wherein at least one of a basic position of a game character and a series of subsequent actions of the game character is changed when the item used by the game character is changed.

6. The game device as defined in claim 1,
    wherein at least one of the number and a type of a special technique of a game character caused by a given input to said control means is changed when the item used by the game character is changed.

7. The game device as defined in claim 1,
    wherein said item is a weapon item; and
    wherein with respect to the weapon item, information relating to at least one of a hit area, offensive power, defensive power, durability, and effect of attack against an enemy game character is changed when the weapon item used by the game character is changed.

8. The game device as defined in claim 1,
    wherein an item selection screen is displayed when the player selects said first mode in said mode selection screen, said item selection screen being a screen in which the player selects an item to be used from a plurality of items including the item obtained in said second mode.

9. The game device as defined in claim 1,
    wherein in said first mode, the player first selects a game character and controls the selected game character to fight with an enemy game character; and
    wherein in said first mode, when the player's game character defeats the enemy game character, the player can advance to the next game stage and the player's game character fight against a new enemy game character so the player sequentially fights against a number of enemy game characters through a series of game stages.

10. The game device as defined in claim 9, wherein in each of the game stages, the player is required to defeat the enemy game character within a limited time period.

11. The game device as defined in claim 1, wherein an ending image for said first mode is displayed at the end of said first mode and an ending image for said second mode is displayed at the end of said second mode and wherein the ending image for said second mode is different from the ending image for said first mode.

12. The game device as defined in claim 1, wherein in said second mode, the player is charged with another mission different from a mission charged to the player in said first mode.

13. The game device as defined in claim 12, wherein in said second mode, the player is charged with a mission in which the player pushes the enemy game character out of the fighting field within a limited time period, or a mission in which the player uses its own special technique within a limited time period.

14. The game device as defined in claim 1, wherein said second mode is used as a game operation guidance for a beginner player.

15. An information storage medium for making a game device synthesize a game image, said information storage device storing:

information for selecting one of a plurality of modes including a first mode in which a player controls a game character through a given control means to make the game character fight against an enemy game character, and a second mode in which a game for obtaining an item to be used by the game character is played;

information for enabling the game character in said first mode to use the item obtained in said second mode, and for changing at least one of an action of the game character caused by an input by the player and information relating to a fight when the item used by the game character is changed; and information for synthesizing a game image including an image of the game character, wherein a mode selection screen is displayed before the start of the game play, said mode selection screen being a screen in which the player selects a mode to be played from a plurality of modes including said first mode and said second mode.

16. The information storage medium as defined in claim 15, wherein an item used by a game character is changed by changing an object representing the item, when the game character is also represented by a plurality of objects.

17. The information storage medium as defined in claim 15, wherein a map showing a plurality of points and information relating to an item obtainable at each of the points are displayed for the player in said second mode.

18. The information storage medium as defined in claim 15, wherein in said second mode, a fight which is performed between the game character controlled by the player and the enemy game character to obtain an item is a different type of fight from the fight in said first mode.

19. The information storage medium as defined in claim 15, wherein at least one of a basic position of a game character and a series of subsequent actions of the game character is changed when the item used by the game character is changed.

20. The information storage medium as defined in claim 15, wherein at least one of the number and a type of a special technique of a game character caused by a given input to said control means is changed when the item used by the game character is changed.

21. The information storage medium as defined in claim 15, wherein said item is a weapon item; and wherein with respect to the weapon item, information relating to at least one of a hit area, offensive power, defensive power, durability, and effect of attack against an enemy game character is changed when the weapon item used by the game character is changed.

22. The information storage medium as defined in claim 15, wherein an item selection screen is displayed when the player selects said first mode in said mode selection screen, said item selection screen being a screen in which the player selects an item to be used from a plurality of items including the item obtained in said second mode.

23. The information storage medium as defined in claim 15, wherein in said first mode, the player first selects a game character and controls the selected gamed character to fight with an enemy game character and in said first mode, when the player's game character defeats the enemy game character, the player can advance to the next game stage and the player's game character fight against a new enemy game character so that the player sequentially fights against a number of enemy game character through a series of game stages.

24. The information storage medium as defined in claim 23, wherein in each of the game stages, the player is required to defeat the enemy game character within a limited time period.

25. The information storage medium as defined in claim 15, wherein an ending image for said first mode is displayed at the end of said first mode and an ending image for said second mode is displayed at the end of said second mode and the ending image for said second mode is different from the ending image for said first mode.

26. The information storage medium as defined in claim 15, wherein in said second mode, the player is charged with an another mission different from a mission charged to the player in said first mode.

27. The information storage medium as defined in claim 26, wherein in said second mode, the player is charged with a mission in which the player push the enemy game character out of the fighting field within a limited time period, or a mission in which the player uses its own special technique within a limited time period.

28. The information storage medium as defined in claim 15, wherein said second mode is used as a game operation guidance for a beginner player.

* * * * *